United States Patent [19]
Gruss et al.

[11] 3,795,472
[45] Mar. 5, 1974

[54] APPARATUS FOR THE PRODUCTION OF ELECTRICALLY HEATED WINDOW

[75] Inventors: George A. Gruss, Mentor; Leslie H. Pfeiler, Willowick; George J. Polanka, Solon, all of Ohio

[73] Assignee: General Electric Company, Schenectady, N.Y.

[22] Filed: Dec. 27, 1972

[21] Appl. No.: 318,867

Related U.S. Application Data

[62] Division of Ser. No. 166,064, July 26, 1971, Pat. No. 3,729,616.

[52] U.S. Cl............... 425/517, 264/249, 425/90, 425/111, 425/112, 425/403, 425/502
[51] Int. Cl............................................. B29c 27/14
[58] Field of Search... 425/109, 403, 393, 501, 502, 425/517, 90, 111, 112; 264/249, 230, 272; 219/522, 544; 338/268

[56] References Cited
UNITED STATES PATENTS

| | | | |
|---|---|---|---|
| 1,009,002 | 11/1911 | Welch | 425/393 |
| 1,643,998 | 10/1927 | Scott | 264/249 X |
| 2,932,710 | 4/1960 | Coale et al | 219/544 X |
| 3,205,467 | 9/1965 | Ganci | 338/268 |
| 3,220,910 | 11/1965 | Walkey | 425/90 X |
| 3,436,041 | 4/1969 | Haller | 264/249 X |
| 3,475,595 | 10/1969 | Leclercg | 219/522 |
| 3,526,692 | 9/1970 | Onako | 425/119 X |
| 3,541,682 | 11/1970 | Hildebrandt | 264/249 X |
| 3,728,425 | 4/1973 | Schrader | 260/230 X |

*Primary Examiner*—Robert L. Spicer, Jr.
*Attorney, Agent, or Firm*—John F. McDevitt; Henry P. Truesdell; Frank L. Neuhauser

[57] ABSTRACT

A laminated safety glass window is described having a clear polymer inner layer which includes a pattern of wrinkled resistance wires oriented in non-parallel random fashion so as to reduce glare from the wires when the window is used as a windshield. The individual resistance wires are partially embedded in the polymer sheet by a technique utilizing shrinkage of a thermoplastic polymer from its original dimensions when heated to an elevated temperature together with having the individual wires change configuration when relaxed from tension forces on the wire when first assembled with the polymer sheet. A method of forming the wire-incorporated polymer sheet member is also described along with equipment for automatically applying prestressed resistance wire to a thermoplastic sheet followed by heating the assembly under proper conditions to form the composite member.

2 Claims, 6 Drawing Figures

PATENTED MAR 5 1974　　　　　　　　　3,795,472
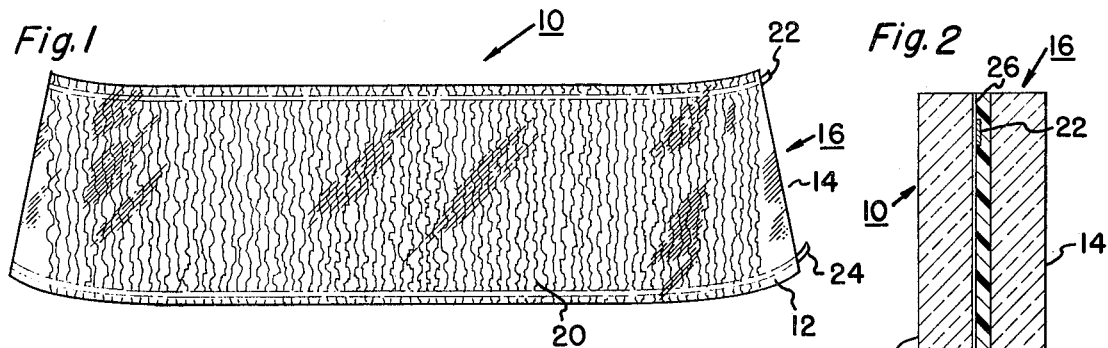
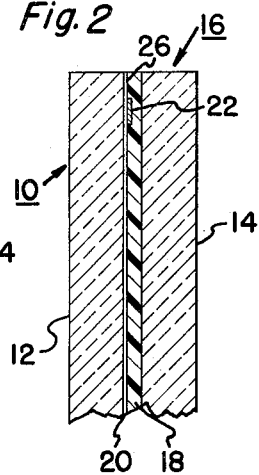
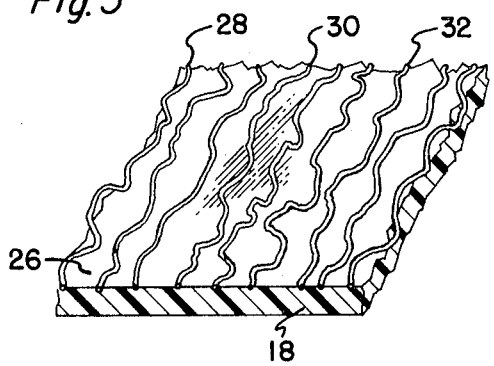
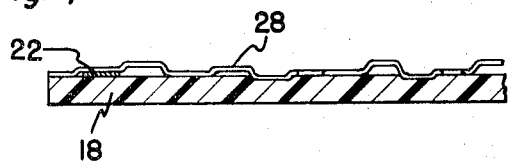
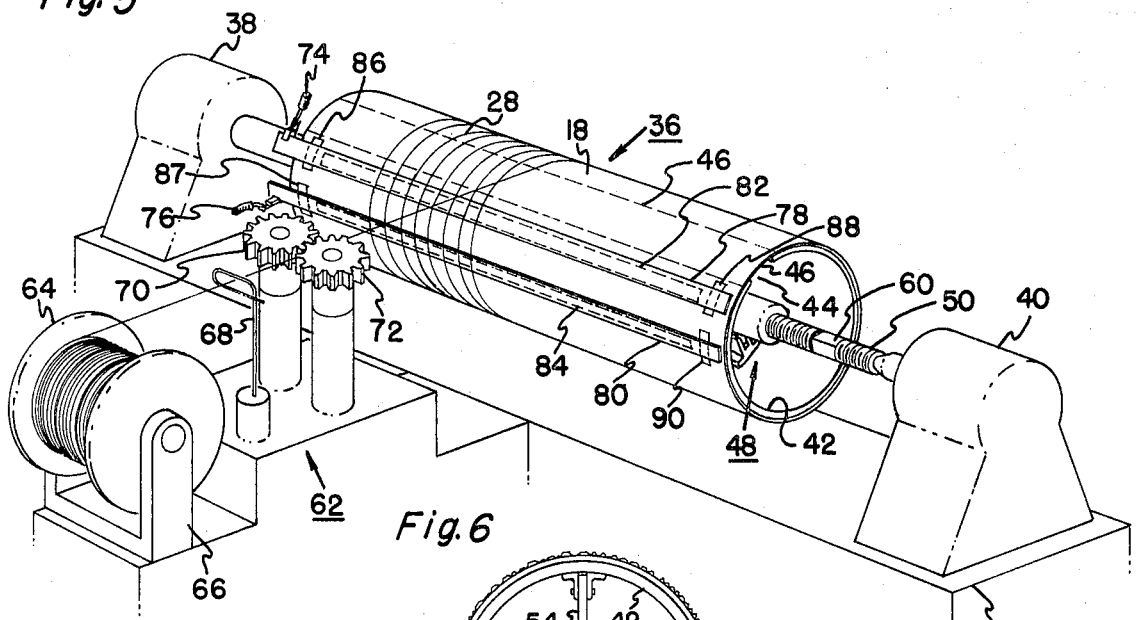
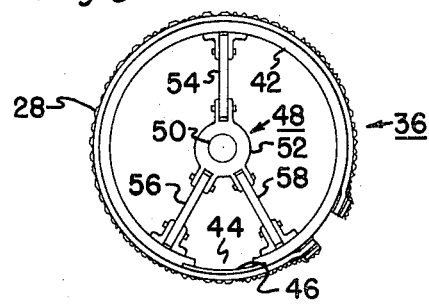

APPARATUS FOR THE PRODUCTION OF ELECTRICALLY HEATED WINDOW

This application is a division of our earlier application, Ser. No. 166,064, filed July 26, 1971, and now issued U.S. Pat. No. 3,729,616.

BACKGROUND OF THE INVENTION

This invention relates to a safety glass window which is particularly suitable for a vehicle windshield. More particularly, it relates to a glass sandwich having a thermoplastic inner layer which includes a pattern of resistance wires that is substantially free from glare when light is transmitted through the window.

Various techniques are already known to fabricate a safety glass window having resistance wires distributed in the thermoplastic inner layer so as not to preclude visability therethrough. In one method a plurality of the resistance wires are arranged in a regular repeating sinusoidal pattern with respect to one another between two glass sheets and bus-bar terminals are affixed at each end of the individual wires to form the electrical heating circuit. In a second method of making the electrically heated window glass, a pattern of straight wires are aligned in closely spaced parallel relationship then applied to a glass plate. Another glass plate is applied thereto to form the sandwich construction and the assembly is then heated to provide the integral product. To achieve the desired parallel wire orientation in this second method, the individual wires are secured under tension in a skeleton frame which keeps the individual wires straight until bonded in the final sandwich assembly. Still a third method for incorporating electrical heating wires into a laminated safety glass construction applies a wire pattern made up of a plurality of closely spaced parallel extending wires upon a clear thermoplastic sheet and tacks the ends of the individual wires with a metal strip at each end. The composite inner layer is then laminated in a conventional manner to provide the final safety glass window. the parallel oriented pattern of resistance wires in this third method are thermally tacked along their length to the sheet before the final lamination step to preclude relative movement between the wires.

In all of the above methods it has been found that glare is produced from a parallel orientation of resistance wires in the glass sandwich. More particularly, there is glare due to either optical reflection or optical diffraction of light rays from the individual wires which is transmitted to the eyes of a viewer looking through the glass sandwich. The glare is especially noticeable under strong lighting conditions such as bright daylight or the headlights of an oncoming vehicle which could preclude acceptance of the final product for vehicle windshield applications.

SUMMARY OF THE INVENTION

Applicants have discovered a novel technique for incorporating electrical resistance wire in a thermoplastic polymer sheet to provide an essentially glare-free pattern when observing objects through the window. The improved construction forms the inner layer of a laminated safety glass member which can be used as a vehicle windshield with the ability to remove ice and snow as well as defrost.

The object of the present invention, therefore, is to provide a superior electrically heated safety glass construction along with methods and apparatus to form such a member. Still a further object is to provide an electrically heated windshield with improved thermal capacity for defrosting as well as removing ice and snow from the windshield. Still another object of the present invention is to provide simple and reliable means of assembling resistance wires with a thermoplastic polymer sheet so that the composite assembly can be easily handled thereafter to produce a laminated safety glass member by conventional techniques.

Briefly stated, the invention in certain of its embodiments provides a composite member comprising a layer of transparent thermoplastic polymer which shrinks from its original dimensions when heated to an elevated temperature having partially embedded in one major surface a plurality of wrinkled resistance wires which lie in closely spaced relationship and are oriented with respect to one another in non-parallel random fashion both in the plane of said major surface as well as in a plane at some angle thereto so as to reduce glare when light is transmitted through the composite member. The term "transparent" as used herein to refer to a thermoplastic polymer material includes material having limited optical clarity but permitting visual identification of objects viewed from the opposite side of the polymer sheet.

BRIEF DESCRIPTION OF THE DRAWINGS

FIG. 1 is a perspective view of a curved window member having a laminated safety glass construction according to the present invention;

FIG. 2 is a vertical section through the windshield member of FIG. 1;

FIG. 3 is a top view partially in cross section of a composite thermoplastic sheet incorporating the random wire pattern produced in accordance with the invention;

FIG. 4 is a sectional view of a segment of the composite member depicted in FIG. 3 wherein one bus-bar electrode is electrically connected to the resistance wire pattern;

FIG. 5 is a perspective view of equipment used to assemble a composite thermoplastic sheet member having the resistance wire pattern of the present invention; and FIG. 6 is a cross-sectional view of a collapsible drum utilized in the FIG. 4 equipment with the composite thermoplastic sheet member wound about its periphery.

DESCRIPTION OF THE PREFERRED EMBODIMENTS

The present invention provides simple and effective means to reduce a major difficulty encountered with a parallel arrangement of resistance heating wires in a laminated safety glass member. While the glare phenomena encountered is not fully understood at the present time, it is believed attributable to the wire direction rather than spacing between the wires. By randomizing the wire direction in accordance with practice of the present invention, it becomes possible to distribute light reflection or diffraction from the individual wires in all directions and thereby reduce or eliminate the glare. While a complete randomization of the individual wires would be most difficult to achieve, the applicants have found that a controlled randomization is sufficient to substantially eliminate the glare problem.

Controlled randomization of the resistance wire pattern is obtained by applying prestressed resistance wires upon one major surface of the sheet of transparent thermoplastic material and thereafter utilizing an ability of the polymer material to shrink from its original dimensions when heated to an elevated temperature to embed portions of the individual wires in the contacted surface of thermoplastic material. More particularly, a pattern of the prestressed resistance wires is applied under tension to one major surface of the thermoplastic sheet so that individual wires are in closely spaced parallel relationship and the composite member so formed is then heated under conditions which permit the individual resistance wires to expand and adopt a configuration attributable to the prestressed forces while becoming partially embedded in the softened thermoplastic material. Subsequent cooling of the composite member provides the final randomization in the wire pattern such that individual wires have a wrinkled or irregular crimp at irregular intervals along their length to provide the non-parallel relationship between adjacent wires. The final non-parallel wire pattern will be governed by thermal expansion differences between the polymer and the wire, the nature and extent of prestress forces applied to the resistance wire before incorporation in the polymer surface, and the heat shrinkage characteristics of the thermoplastic material. Said non-parallel random configuration of the wire exists both in the plane of a major surface of the polymer sheet as well as in a plane at some angle thereto.

The relatively high heating capacity of the wire pattern obtained by practice of the invention is due to using fine wire having a diameter from approximately 0.0003 inches to 0.0009 inches in a spacing from 10 to 30 wires/inch. While it is recognized that wattage dissipation obtained by connecting the wire pattern to a source of electrical energy will depend upon such factors as voltage and contact resistance as well as diameter of the wire and spacing of wires, it has been reported that a wire pattern as above described can provide from 0.25 watts/inch square to 0.5 watts/inch square wattage dissipation when connected to a conventional automotive power supply which is said to be adequate heating energy to defrost a windshield quickly over a much larger area than is possible with conventional hot air defrosting. The heating circuit can be provided with copper strip bus-bars of ¼ inch width and a 0.002 inch thickness being applied at each end of the individual resistance wires to provide a parallel electrical connection which is not affected by short circuit if the individual wires become crossed during fabrication of the random wire pattern. Minimum contact resistance can be obtained at the bus-bar connections by laying the copper strips across the wire and thereafter assembling the final window constructon which can be heated to approximately 275°F under about 300 p.s.i. pressure to laminate the entire assembly. Understandably, other electrode means than bus-bars are contemplated within the scope of the present invention as well as different electrically conducting materials than copper for said electrodes.

Turning now to the drawings, FIG. 1 represents a schematic view of a conventional automobile windshield having the substantially glare-free resistance wire pattern produced in accordance with the invention. More particularly, a laminated safety glass sandwich 10 is shown which comprises a pair of outer glass layers 12 and 14 which are held together by adhesive bonding to composite thermoplastic sheet member 16 as an integral construction. Said composite thermoplastic inner layer 16 (which is shown more clearly in FIG. 2) includes a sheet of transparent thermoplastic polymer 18 having partially embedded in one major surface a plurality of wrinkled resistance wires 20 which are oriented with respect to one another in nonparallel random fashion. Bus-bar strips 22 and 24 are disposed at each end of the individual resistance wires to provide electrode means for heating the wires from the already available electrical power supply in the vehicle.

In FIG. 2 there is shown a vertical section through the windshield member of FIG. 1 which more clearly illustrates a greater degree of randomness assumed by the individual resistance wires 20 in the final windshield assembly. More particularly, when said resistance wires are first incorporated in composite sheet member 16 to provide an inner layer for bonding the outer glass layers together, there is a three-dimensional wire configuration wherein the wires are oriented with respect to one another in non-parallel random fashion both in the plane of a major surface of the polymer sheet as well as in a plane at some angle thereto which can be seen in greater detail by reference to FIGS. 3 and 4. Those portions of the individual wires which protrude from the polymer surface 26 are free to move when compressed by the adjacent glass layer 14 during lamination of the final glass sandwich. In so doing, the wires undergo further random orientation with respect to the plane of said major surface in said final assembly. Said in another way, the composite thermoplastic sheet member 16 produced in accordance with the invention is so formed to enhance random orientation of the individual resistance wires when assembled in the final glass sandwich construction.

FIG. 3 is a top view partially in cross section of the composite thermoplastic member 16 which is produced in a manner to be more fully explained hereinafter. Thermoplastic sheet element 18 comprises a transparent thermoplastic polymer which shrinks from its original dimensions when heated to an elevated temperature having partially embedded in major surface 26 a plurality of wrinkled resistance wires illustrated by numerals 28, 30 and 32 which protrude from said major surface in random fashion where not embedded in the polymer material. It can also be noticed that said individual wires are further oriented with respect to one another in random fashion and lie in closely spaced relationship to provide the wattage dissipation needed for defrosting as well as ice and snow removal.

FIG. 4 is a sectional elevation view of a segment of the composite member depicted in FIG. 3 which includes one bus-bar electrode 22 not shown in the preceding figure. It can be noted that the bus-bar electrode lies intermediate the wire pattern and the polymer sheet although it is within contemplation of the present invention to provide different orientation of the electrode means in the composite sheet member. The bus-bar strips can be affixed to the individual resistance wires and the underlying thermoplastic sheet 18 to provide minimal contact resistance during the thermal tacking step used to assemble the composite member. It can also be noted in FIG. 4 that portions of the individual resistance wire shown protrude at different elevations from the surface of the polymer sheet due to localized differences governing distribution of said wire with respect to the polymer sheet.

FIG. 5 is a perspective view of equipment which can be used to assemble the composite member 16. A modified machine lathe 34 provides the support means for rotatably mounting a collapsible drum member 36 upon which the polymer sheet and wire constituents of the composite member are wound. More particularly, headstock 38 and tailstock 40 provide convenient means to suspend the drum member therebetween for subsequent winding and heating of the composite assembly. Collapsible drum member 36 has an exterior cylindrical shell 42 which includes a slot 44 extending along its entire axial length to permit decreasing the drum circumference by a predetermined amount after initial assembly of the composite sheet member and prior to a heat shrinkage processing step. The slot opening in said drum member is occupied by overlapping panel 46 to provide a continuous surface on the drum for winding the polymer sheet and the wire pattern. The drum construction is depicted more clearly in FIG. 6 along with the wrapped composite sheet member. The drum member 36 further includes a feed screw assembly 48 affixed to the interior wall of shell 42 which cooperates in reducing the drum circumference. The feed screw assembly includes a feed screw 50 aligned along the longitudinal axis of the drum which threadably engages web member 52 to permit radial displacement of arms 54, 56 and 58 by conventional linkage not shown. A duplicate web member at the opposite end of the drum member (which is also not shown) engages the feed screw in like manner to provide a means of uniformly reducing the drum diameter along its entire length. An unthreaded portion 60 is provided on the feed screw to provide convenient gripping means for operating the feed screw assembly to adjust the drum diameter.

Lathe 34 includes a carrier assembly 62 which can be mounted upon the tool guide means ordinarily employed with a machine lathe to provide movement of the supported structure in a direction parallel to the longitudinal axis of the lathe. The carrier assembly includes a spool 64 of the resistance wire 28 rotatably mounted in frame 66 as a means of supplying the wire for winding around the drum periphery. Said carrier assembly also includes guide means 68 which positions the wire being supplied in the mesh between spur gear members 70 and 72 prior to winding about the drum periphery. Said spur gears are rotatably mounted upon the carriage assembly in a loosely meshing engagement sufficient to permit passage of the thin resistance wire being employed without breakage while applying a slight crimp to the wire being processed. More particularly, said gear means provide a prestress condition to the wire prior to its assembly with the thermoplastic sheet on the drum periphery such that said wire can thereafter be applied under tension as straight wire which becomes crimped or wrinkled only upon removal of the tension forces after winding in a manner to be described.

Lathe 34 is also equipped with a pair of electrical power supply members 74 and 76 that are connected to bus-bar strips 78 and 80, respectively, to provide means for heating the composite member after assembly. It should be appreciated that while separate and distinct bus-bar strips are employed in fabricating the composite member from the bus-bar strips 22 and 24 employed in the final laminated safety glass sandwich to heat the window that it is within contemplation of the present invention to employ a single pair of bus-bar strips for both purposes.

In operation, a sheet of thermoplastic material 18 is wound about the drum periphery and secured to said periphery at each end with adhesive strips 82 and 84 at a location which can correspond to placement of the bus-bars. Bus-bar strips 78 and 80 are next affixed to the external periphery of the drum member by additional adhesive strips 86–90 located at each end of the bus-bar elements. Next, a helical coil of the prestressed resistance wire 28 is wrapped about the drum periphery in closely spaced relationship by activating the carriage assembly while the drum is being rotated all in conventional lathe operation technique. The wire pattern being applied to one major surface of the polymer sheet conforms to a parallel orientation between adjacent wire turns and the helical wire coil is then secured to the drum periphery with additional adhesive strips (not shown) which can be disposed at the same location being occupied by the bus-bars. The wire coil can then be cut along its length in the spacing between said bus-bars to define an electrical path entirely about the circumference of the coil for heating the assembly to provide the composite sheet member.

After assembly of the composite member in the manner above indicated, the wire pattern is embedded in the plastic sheet by heating the composite member under conditions permitting the resistance wire to adopt a configuration attributable to the prestress forces while maintaining the polymer sheet in physical contact with the resistance wire on the drum periphery. Specifically, the drum circumference is reduced sufficiently to permit the composite member to sag under gravitational forces from the drum surface which relaxes the tension forces on the resistance wire enabling it to crimp or wrinkle along its length while still maintaining point contact with the polymer sheet. Electrical energy is supplied to the wire pattern while in this sagged configuration which heats the polymer material to its softening point thereby permitting portions of the wire still in physical contact with the polymer surface to become embedded therein. Under such heating conditions, both polymer sheet and wire pattern are permitted to expand and contract along the direction of the wire path depending upon individual thermal expansion characteristics while still remaining in physical contact. It has been noted during this heating operation that the polymer sheet contracts visibly while still being heated after first undergoing thermal expansion with the shrinkage occurring along the direction of the wire path. Heating is discontinued by interrupting the electrical energy being supplied to the wire pattern after the shrinkage has taken place whereupon the composite member is allowed to cool which produces an adhesive bond with the wire pattern. By reason of alignment between the wire path and the shrinkage direction in the polymer sheet, it can be seen that a greater randomization in the final wire pattern is provided than otherwise would occur. It has also been noted during experience with this process that certain polyvinyl butyral polymer sheets which are conventionally employed as the inner layer in laminated safety glass undergo greater shrinkage in one direction along the major surface than in a surface direction perpendicular thereto. By aligning the direction of greater shrinkage with the direction of wire travel, it thereby becomes possible to further enhance randomization of the wire pattern in accordance with objectives of the present invention.

It can be appreciated from the foregoing description of one embodiment employed to fabricate the composite sheet member that various other methods could be employed with comparable results. More particularly, it is contemplated that a plurality of individual prestressed wire lengths could be applied under tension to the major surface of a polymer sheet and after being secured at each end to said sheet in the manner previously described then permitted to undergo the same general type heat shrinkage procedure. It is also contemplated to prestress the resistance wire with a misaligned drawing die when drawing the wire and provide such prestressed wire under tension during assembly of the composite sheet member. Likewise, it is further contemplated that different equipment than above described could be designed for applying prestressed resistance wire under tension to one major surface of the polymer sheet and thereafter automatically carrying out the heat shrinkage operation. It is intended to limit the present invention, therefore, only to the scope of the following claims.

We claim:

1. An apparatus for assembling a thermoplastic polymer sheet having a wire pattern partially embedded therein which comprises:

a. support means permitting a thermoplastic sheet to shrink from its original dimensions when heated to an elevated temperature,
   b. tensioning means to apply a pattern of prestressed wire to one major surface of the supported polymer sheet so that individual wires lie in closely spaced parallel relationship with respect to one another,
   c. fastening means to secure opposite ends of the wire pattern along the direction of the wire path to the major surface of the polymer sheet,
   d. means to relax the tension upon the individual wires so that said wires adopt a configuration attributable to the prestress forces while maintaining the polymer sheet in physical contact therewith, and
   e. heating means which cooperate with said support means to shrink the polymer sheet so as to have partially embedded therein a plurality of the individual wires such that portions of said individual wires protrude from said major surface of the polymer sheet.

2. An apparatus as in claim 1 wherein the support means comprises a collapsible drum which can be reduced in diameter a predetermined amount.

* * * * *